United States Patent [19]
Hjorth-Hansen

[11] Patent Number: 5,603,148
[45] Date of Patent: Feb. 18, 1997

[54] TIRE AND WHEEL SERVICING SYSTEM

[76] Inventor: Arne Hjorth-Hansen, Helgasvej 25, DK-8660 Skanderborg, Denmark

[21] Appl. No.: 348,105

[22] Filed: Nov. 25, 1994

[51] Int. Cl.$^6$ .............................. B23P 21/00; B60C 25/00
[52] U.S. Cl. .............................................. 29/33 R; 157/1.1
[58] Field of Search ........................ 157/1.1, 1.24, 157/1, 1.17; 29/33 R, 33 P

[56] References Cited

U.S. PATENT DOCUMENTS

| | | | |
|---|---|---|---|
| 4,420,026 | 12/1983 | Goiseau | 157/1.24 |
| 4,621,671 | 11/1986 | Kane et al. | 157/1.1 |
| 4,789,015 | 12/1988 | Flinn | 157/1.1 X |
| 4,834,159 | 5/1989 | Burger | 157/1 |

FOREIGN PATENT DOCUMENTS

| | | | |
|---|---|---|---|
| 53905 | 5/1981 | Japan | 157/1.1 |
| 2223842 | 9/1990 | Japan | 157/1.1 |
| 1654023 | 6/1991 | U.S.S.R. | 157/1.1 |

*Primary Examiner*—William R. Briggs
*Attorney, Agent, or Firm*—Antonelli, Terry, Stout & Kraus, LLP

[57] ABSTRACT

A tire and wheel servicing arrangement including a bead breaking station, a tire changing station, a tire inflating station, and a wheel balancing station in which the stations are positioned sequentially in a line and adjacent each other to permit transfer of a wheel-mounted tire from one station to the next by simply pushing or sliding of the tire. The inflating station can include a V-shaped tire receiver for facilitating turning over of the wheel mounted tire. That tire receiver can be tiltable downwardly under the weight of a wheel mounted tire to aid in positioning the wheel mounted tire on the wheel balancing station.

21 Claims, 1 Drawing Sheet

TIRE AND WHEEL SERVICING SYSTEM

BACKGROUND OF THE INVENTION

The present invention relates to a tire and wheel servicing arrangement comprising different workshop units for effecting respective relevant operations such as bead breaking, tire changing, inflation and balancing. Such specialized units have been available for many years, and it has been customary to mount them as separate units at convenient places of the workshop, often against a wall and with noticeable mutual spacing, whereby it has also been accepted as a requirement to roll or carry the wheels between the units.

SUMMARY OF THE INVENTION

According to the present invention the said different units are looked upon as parts of one integral 'servicing system', in which they are arranged as cooperating units in an operationally successive manner and mutually disposed such that the wheels can be transferred from one unit to the next with a minimum of effort on the part of the operator.

It is a very common practice that in workshops specialized in tire changing and repair each operator has his own set of the said specialized units, because it would otherwise happen rather frequently that one or more operators would have to wait for a first operator to finish his use of a given unit, e.g. a balancing machine. Admittedly, this may happen rather frequently, but it certainly also happens frequently that such a unit is not in use for a considerable period of time. With the system according to the invention, it will be ensured that all of the units are brought into operation in a systematic manner with a relatively short cycle time, whereby the resulting capacity of a single array of units will be very high compared with the more occasional use of different independent units.

In fact, it is a qualified estimate based on experiments that with the use of the system according to the invention, the workshop may work with one in-line-system for every two complete sets of individual, separate units used according to the conventional practice, when also the operators are specialized in working in front of and behind or in the system, respectively, i.e. dealing for one part with the dismounting and remounting of the wheels relative the cars and for another part with the operation of the very wheel treating system.

Thus, the workshop owner may drastically reduce the expenses connected with the aquisation of machinery, or in other words the owner may be encouraged to steadily keep the machinery up to the highest developed standards.

BRIEF DESCRIPTION OF THE DRAWINGS

In the following the invention is described in more detail with reference to the drawing, in which.

DETAILED DESCRIPTION OF PREFERRED EMBODIMENTS

Figure 1:
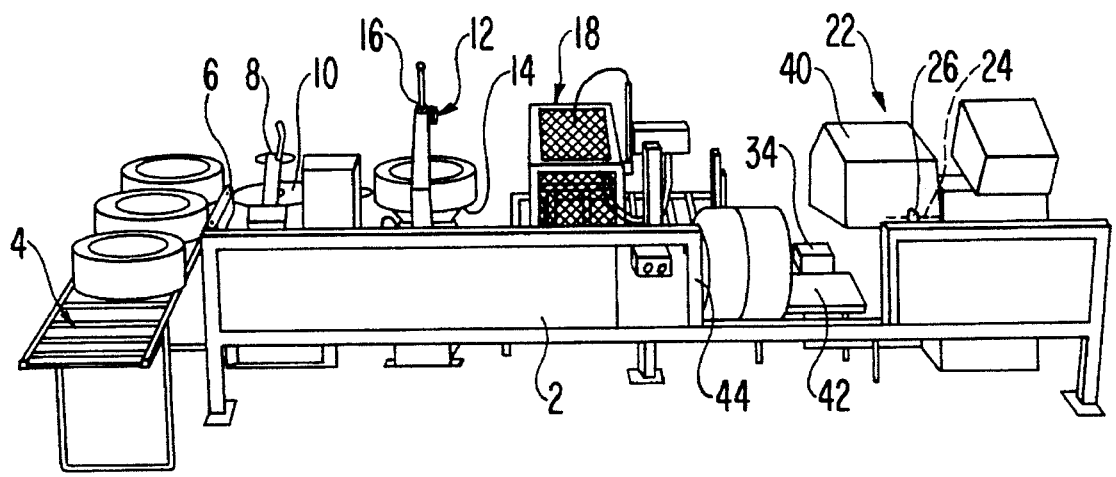
FIG. 1 is a perspective view of a system according to the invention seen from the customer's side.

The system as shown in FIG. 1 comprises a partition panel 2, behind which there is mounted a series of working units to be described in more detail below. The panel 2 forms a rear wall of a workshop bay for receiving cars for wheel repairs and preferably fitted with a car lift for facilitating removal of the wheels. These are then taken to an infeed conveyor 4, which is only a passive roller table slanting slightly downwardly from its front end. At its rear end the wheels will meet a stop, such that the rear wheel position will be a position of entrance to the working system along the panel 2. At this place there is mounted a roller 6 along the inner side edge of the roller table, and a first working unit 8 has a receiving table 10 located immediately outside this roller. Thus, the wheel can simply be drawn or pushed onto the table 10, aided by the roller 6 providing for a rolling support.

The unit 8 is a bead breaker, serving to press the upper tire bead downwardly from the rim by means of an upper pressing tool while the table 10 is rotating. When it is required to break also the opposite bead, e.g. for a complete tire change, the operator can turn the wheel upside down on the table 10, merely by tilting over the wheel, without actually lifting the entire wheel. Alternatively, of course, the unit 8 could be designed so as to effect a bead breaking even at the lower side of the wheel.

The following unit, designated 12, is a tire changer having a rotary wheel supporting table 14 and an upper tool 16 for heeling the tire bead over the rim edge, as well known in the art. The unit 12 is placed so close to the unit 8 that the wheel can be transferred simply by sliding or tilting-over, again without being carried as a whole.

When the repair or tube or tire change has been effected at the unit 12 the wheel will then be correspondingly easily transferable to the subsequent unit, designated 18, which is an automatically operating inflation unit, as such already known in the art. However, it is here designed as a flow-through unit comprising a roller table bottom 20 (FIG. 2) for easy reception and delivery of the lying wheel. In this instance it is imperative that the wheel be oriented with its inflation valve located at the top side of thereof; i.e. with its outer side turned upwardly.

The following and last operation unit is a balancing machine 22, which has a horizontally oriented rotation shaft 24 with an outer mounting head 26 for receiving the wheel in an upright position thereof and with the deep portion of the wheel rim facing the balancing unit, i.e. with the inflation valve carrying wheel side facing away from the unit 22.

When the wheels in the inflation unit 18 are oriented with their valve side turned upwardly it will not be possible to transfer the wheels to the balancing machine by a mere tilting of the wheels, as these will have to be turned by 180°.

Figure 2:
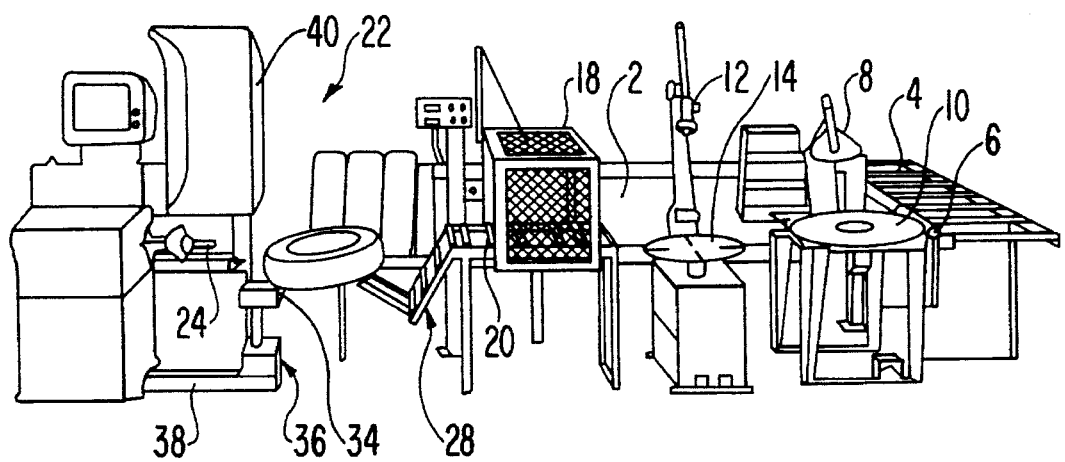
FIG. 2 is a corresponding view of the system seen from the operator's side.

It is a special feature of this invention that such a turning may be effected in an easy manner by means of a simple V-shaped frame structure 28 at the outlet end of the roller table bottom 20, see FIG. 2. The wheel may be pushed over the outlet edge of the table 20, whereby it will tilt over this edge and place itself leaning against the first branch of the V-structure 28 and supported against the opposite branch. Then the operator can easily tilt the wheel over to make it lean against the latter branch, now with the rear wheel side upwardly exposed and ready to be tilted once again.

Figure 3:
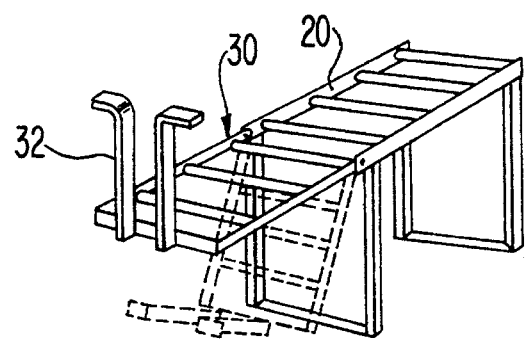
FIG. 3 is a more detailed view of one of the units of the system.

The same result, however, is achievable in a smoother manner when the V-structure 28, as shown in FIG. 3 and in fact also in FIG. 1, is tiltably connected with the roller table 20 such that in a receiving position the said first branch, designated 30 and equipped with rollers, forms a straight continuation of the roller table 20 for easy reception of the wheel. As the weight of the wheel is transferred to the roller branch 30, the latter will yield against the action of a gas spring (not shown) so as to pivot down to the position shown in dotted lines in FIG. 3 and in full lines in FIG. 2. In continuation of that movement it is easy to tilt the wheel over against the other V-branch, 32, and then further over the end of the V-branch 32 such that the former top end of the wheel is now laid down on a support member 34, onto which the wheel is to be placed preparatory to its being mounted in the balancing machine 22. The operator then tilts the wheel into an upright position on the support 34, which belongs to a unit 36 of known type for supporting the wheel in a 'height floating' or 'weightless' manner, enabling the wheel to be adjusted both up and down by a very small pressure against it, in order to adjust the center hole of the wheel rim to the correct position for insertion on the mounting head 26 of the balancing machine 22. Moreover, the support unit 36 is easily displaceable along a rail element 38, whereby the operator, holding the wheel upright on the support member 34, may easily displace the wheel and the support unit 36 towards the balancing machine so as to bring the wheel into its mounting position on the mounting head 26.

When the wheel is removed from the V-branch 32 the structure 28 will pivot up to its receiving position, even assisting in the initial delivery tilting of the wheel onto the support 34.

The support member 34 is caused to be lowered as soon as the wheel is bolted to the mounting head 26, and then the balancing work is done, normally with a security hood 40 lowered over the spinning wheel. Thereafter the support member 34 is raised into contact with the wheel, and the wheel is dismounted from the mounting head. The operator, again holding the wheel upright on the support 34, now displaces the support unit and the wheel back along the rail 38, to a return position outside of the security hood 40. In front of this position there is provided a horizontal carrier plate 42 and an opening in the panel 2, such that the operator can simply roll the finished wheel from the support member 34 onto the plate 42 and then ease the wheel sideways to make it abut an end post 44 of the panel opening or a previously delivered wheel leaning thereagainst. Preferably, the panel opening is wide enough to accommodate four wheels.

An operator on the 'car side' of the panel 2, having delivered wheels from one or more cars to the feeding conveyor 4, may take the repaired wheels consecutively or groupwise from the panel opening and remount the wheels on the relevant cars.

The 'car side' of the panel will also be a 'customer side' and it will be appreciated that a customer desiring to follow the work can walk along the front side of the panel without in any way interfering with the repair operator's work, and yet be in face-to-face relation with the operator such that the customer's view at the operations and communication with the operator will be better than in conventional arrangements where the customer may even stand behind the back of the operator.

Another main advantage is that the repair operator will be able to handle the wheel all the way through the repair line without having to carry the entire wheel at any time, all wheel transfers taking place by way of sliding or tilting of the wheel. It could well be possible to automate the transfer functions, but it has been realized that in the manner described there will be no need for additional mechanical assistance. The functions to be performed can be done in an ergonomically optimized way, such that the price of the entire system can be held reasonably low.

It should be mentioned that an ideal manner of arranging the work will be to use one car side operator, one rapair side operator and one balancing operator.

I claim:

1. Apparatus for servicing tires and wheels, comprising:
   an infeed conveyor for receiving and conveying wheel-mounted tires;
   a bead breaking station adjacent said infeed conveyor to permit transfer of wheel-mounted tires from said infeed conveyor onto said bead breaking station by pushing of each tire manually from said transfer conveyor onto said bead breaking station for breaking of a bead of the tire;
   a tire changing station adjacent said bead breaking station to permit transfer of the wheel-mounted tires from said bead breaking station onto said tire changing station by sliding of each tire manually from said bead breaking station to said tire changing station for changing of the tire on the wheel;
   a tire inflating station adjacent said tire changing station to permit transfer of the wheel-mounted tires from said tire changing station to said tire inflating station by sliding of each tire manually from said tire changing station to said tire inflating station for inflation of the wheel-mounted tire;
   a wheel balancing station adjacent said tire inflating station to permit transfer of the inflated tires from said tire inflating station to said wheel balancing station by sliding or tilting each tire manually from said tire inflating station to said wheel balancing station for balancing of the wheel with the inflated tire mounted thereon; and
   a discharge station adjacent said wheel balancing station to permit discharge of the tires from said apparatus following transfer of the tires from said wheel balancing station to said discharge station.

2. Apparatus according to claim 1, in which said infeed conveyor comprises a slightly inclined, passive roller conveyor having a delivery end with a side edge roller for facilitating orthogonal transfer of the wheel-mounted tire to said bead breaking station.

3. Apparatus according to claim 1, in which said tire inflating station comprises a flow-through unit with a roller table extending between an inlet end and outlet end of thereof.

4. Apparatus according to claim 3, in which said flow-through unit has sides formed of screen walls.

5. Apparatus according to claim 3, further comprising a generally V-shaped tire receiver between said tire inflating station and said wheel-balancing station for facilitating transfer of the wheel-mounted tires therebetween.

6. Apparatus according to claim 5, in which said wheel balancing station includes a carrier platform spaced from said receiver to permit a wheel-mounted tire, when received in said receiver, to be tilted forwardly onto said carrier platform and to be still further tiltable into an upright position on said carrier platform.

7. Apparatus according to claim 5, in which said receiver comprises a roller conveyor having a free end pivotally connected with said inflation station and operable to assume a position in which said roller conveyor forms an extension of said roller table, and an upright member on the outer end of said roller conveyor, said receiver being tiltable downwardly under the weight of a wheel-mounted tire to a swung down position in which said roller conveyor and said upright member are inclined to opposite sides.

8. Apparatus according to claim 1, further comprising a partition wall having said bead breaking station, said tire changing station, said tire inflation station, and said wheel balancing station therebehind, and in which said discharge station comprises a delivery opening in said partition wall and a gap between said tire inflation station and said wheel balancing station and behind said delivery opening.

9. Apparatus according to claim 1, further comprising a generally V-shaped tire receiver between said tire inflating station and said wheel-balancing station for facilitating transfer of the wheel-mounted tires therebetween.

10. Apparatus as claimed in claim 5, in which said tire receiver facilitates turning over of the tires as the tires are transferred.

11. Apparatus according to claim 7, in which said receiver further comprises spring bias means for urging said receiver upwardly against the weight of the wheel-mounted tire.

12. Apparatus according to claim 9, in which said wheel balancing station includes a carrier platform spaced from said receiver to permit a wheel-mounted type, when received in said receiver, to be tilted forwardly onto said carrier platform and to be still further tiltable into an upright position on said carrier platform.

13. Apparatus according to claim 9, in which said receiver comprises a roller conveyor having a free end pivotally connected with said inflation station and operable to assume a position in which said roller conveyor forms an extension of said roller table, and an upright member on the outer end of said roller conveyor, said receiver being tiltable downwardly under the weight of a wheel-mounted tire to a swung down position in which said roller conveyor and said upright member are inclined to opposite sides.

14. Apparatus according to claim 13, in which said receiver further comprises spring bias means for urging said receiver upwardly against the weight of the wheel-mounted tire.

15. Apparatus as claimed in claim 10 in which said tire receiver facilitates turning over of the tires as the tires are transferred.

16. Apparatus for servicing tires and wheels, comprising:

a bead breaking station for breaking of a bead of the tire;

a tire changing station adjacent said bead breaking station to permit transfer of the wheel-mounted tires from said bead breaking station onto said tire changing station by sliding of each tire manually from said bead breaking station to said tire changing station for changing of the tire on the wheel;

a tire inflating station adjacent said tire changing station to permit transfer of the wheel-mounted tires from said tire changing station to said tire inflating station by sliding of each tire manually from said tire changing station to said tire inflating station for inflation of the wheel-mounted tire;

a wheel balancing station adjacent said tire inflating station to permit transfer of the inflated tires from said tire inflating station to said wheel balancing station by sliding or tilting each tire manually from said tire inflating station to said wheel balancing station for balancing of the wheel with the inflated tire mounted thereon; and a discharge station adjacent said wheel balancing station to permit discharge of the tires from said apparatus following transfer of the tires from said wheel balancing station to said discharge station.

17. An apparatus as claimed in claim 16, wherein said stations are arranged in a line, and wherein said apparatus further comprises a partition wall in front of said line and having a delivery opening in front of a gap between said inflation unit and said balancing unit.

18. A tire and wheel servicing arrangement comprising a plurality of different workshop units for effecting respective relevant operations, including a bead breaking unit, a tire changing unit, an inflation unit, and a wheel balancing unit, said units being arranged operatively sequentially in a line formation and spaced sufficiently close together to permit wheel-mounted tires to be manually transferred from one unit to the next by being slid or tilted, such that the wheels nowhere in the line need to be operator lifted in their entirety, and a partition wall in front of said line formation, said partition wall having a delivery opening in an area in front of a gap between said inflation unit and said balancing unit.

19. A tire and wheel servicing arrangement comprising a plurality of different workshop units for effecting respective relevant operations, including a bead breaking unit, a tire changing unit, an inflation unit, and a wheel balancing unit, said units being arranged operatively sequentially in a line formation and spaced sufficiently close together to permit wheel-mounted tires to be manually transferred from one unit to the next by being slid or tilted, such that the wheels nowhere in the line need to be operator lifted in their entirety, and wherein said inflation unit is a flow-through unit having an inlet end, and outlet end, and a roller table extending between said inlet end and said outlet end, said outlet end having a generally V-shaped receiver for turning the wheel-mounted tires over.

20. An arrangement according to claim 19, in which said wheel balancing unit includes a carrier platform, and said V-shaped receiver is located next to said carrier platform, while being spaced from said carrier platform, in such a manner that a wheel-mounted tire, when received in the V-shaped receiver and then tilted further forwardly, will land on said carrier platform so as to be still further tiltable into an upright position on said carrier platform.

21. An arrangement according to claim 19, in which said V-shaped receiver comprises two opposed receiver branches, one receiver branch being a roller conveyor having a free end pivotally connected with said outlet end of said inflation unit, whereby said one receiver branch is operable to assume a position in which said one receiver branch forms an extension of said inflation unit roller table; the other receiver branch forming an upright on the outer end of said extension; and in which said V-shaped receiver is tiltable to a swung down position in which said opposed receiver branches are inclined to opposite sides.

* * * * *